United States Patent [19]

Zelazny

[11] Patent Number: 5,438,885
[45] Date of Patent: Aug. 8, 1995

[54] COARSE PARTICLE SNIFFER

[75] Inventor: Joseph S. Zelazny, Webster, N.Y.

[73] Assignee: Xerox Corporation, Stamford, Conn.

[21] Appl. No.: 135,522

[22] Filed: Oct. 12, 1993

[51] Int. Cl.[6] ............................................... B01D 37/00
[52] U.S. Cl. ................................ 73/864.71; 73/28.04; 73/863.23
[58] Field of Search ............... 73/28.04, 863.23, 864.34, 73/864.71

[56] References Cited

U.S. PATENT DOCUMENTS

| 2,458,508 | 1/1949 | Goetz | 73/863.23 |
| 2,467,652 | 4/1949 | Beede | 73/863.23 X |
| 3,748,905 | 7/1973 | Fletcher et al. | 73/28.04 X |
| 3,751,992 | 8/1973 | Morgan | 73/863.23 X |
| 4,502,951 | 3/1985 | Koenig et al. | 73/863.23 X |
| 4,772,454 | 9/1988 | Jarolics | 73/863.23 X |
| 5,332,512 | 7/1994 | Wells | 73/863.23 X |

FOREIGN PATENT DOCUMENTS 1018596  1/1966  United Kingdom ............... 73/28.04

Primary Examiner—Christopher K. Moore
Attorney, Agent, or Firm—Oliff & Berridge

[57] ABSTRACT

A vacuum attachment tool and method for using the tool is provided with a fluidizing nozzle, a screen holder having a screen with a predetermined mesh size, and a venturi for increasing the speed of air and particles passing through the screen. The tool is particularly useful for sampling dry toner particles from large supply hoppers and filtering out "coarse" particles. This tool can readily determine locations having oversized particles and is provided with several attachments that aid in collection. The tool is readily attachable to a vacuum hose of a vacuum source.

15 Claims, 2 Drawing Sheets

COARSE PARTICLE SNIFFER

BACKGROUND OF THE INVENTION

1. Field of the Invention

This invention generally relates to a vacuum cleaner attachment tool and a method for using the attachment tool. More particularly, this invention relates to a vacuum attachment that draws dry toner through a filter within the attachment tool, providing a readily available troubleshooting tool for locating and determining the extent of coarse toner particles within a toner supply.

2. Description of Related Art

Dry toner, such as that used in electrophotographic processes, needs to have high levels of uniformity in its particle size. If coarse particles are found during filling operations at a loading station, the capability to readily locate where the coarse particles were generated is highly desirable. Normally, determining where coarse particles are being generated involves taking samples at various locations within a toner hopper and sending the samples to a laboratory for analysis, resulting in many hours of machine downtime while the locations of the coarse particles are established.

A simple device is needed that can readily determine the presence and extent of coarse particles within a toner supply at the toner supply site.

SUMMARY OF THE INVENTION

The invention provides a vacuum attachment tool that can be readily connected to an existing vacuum source having a vacuum hose of a standard size.

The invention also provides a simple troubleshooting tool that readily draws toner samples into the tool and traps any coarse particles present in the sample within a filter device of the tool for easy analysis.

These and other objectives and advantages are provided, in a first embodiment of the invention, by a coarse particle sampling tool defining an internal orifice flow path fluidly communicating with a vacuum source having a vacuum hose of a predetermined diameter, the tool comprising:

- a fluidizing nozzle defining a portion of the fluid flow path and having an entrance port and an exit port, the entrance port having a diameter substantially smaller than the predetermined diameter of the vacuum hose and the exit port having a diameter larger than the entrance port;
- a screen holder having an entrance port and an exit port defining another portion of the flow path, the entrance port of the screen holder fluidly communicating with the exit port of the fluid nozzle;
- a screen of a predetermined mesh size located in the screen holder within the flow path near the exit port of the screen holder;
- a venturi located in the flow path between the entrance port of the fluidizing nozzle and the screen for increasing the flow speed of particles through the screen, preferably between about 1500 ft./min. and about 7000 ft./min.; and
- an exit end of the sampling tool adapted for removably attaching the tool to an end of the vacuum hose of the vacuum source.

Additional preferred embodiments include further attachments, including a right angle extension connected to the screen holder, one or more extensions connected to the fluidizing nozzle, and an adaptor for connecting the tool to a standard vacuum hose. These aid in readily locating the tool within a toner supply.

This tool is capable of obtaining and filtering toner particles. By viewing the contents within the filter one can readily ascertain the extent of coarse particles within the sampled toner.

These and other features and advantages of mentioned are described in or apparent from the following detailed description of the preferred embodiments.

BRIEF DESCRIPTION OF THE DRAWINGS

The preferred embodiments are described in reference to the drawings, in which.

DETAILED DESCRIPTION OF THE PREFERRED EMBODIMENTS

Figure 1:
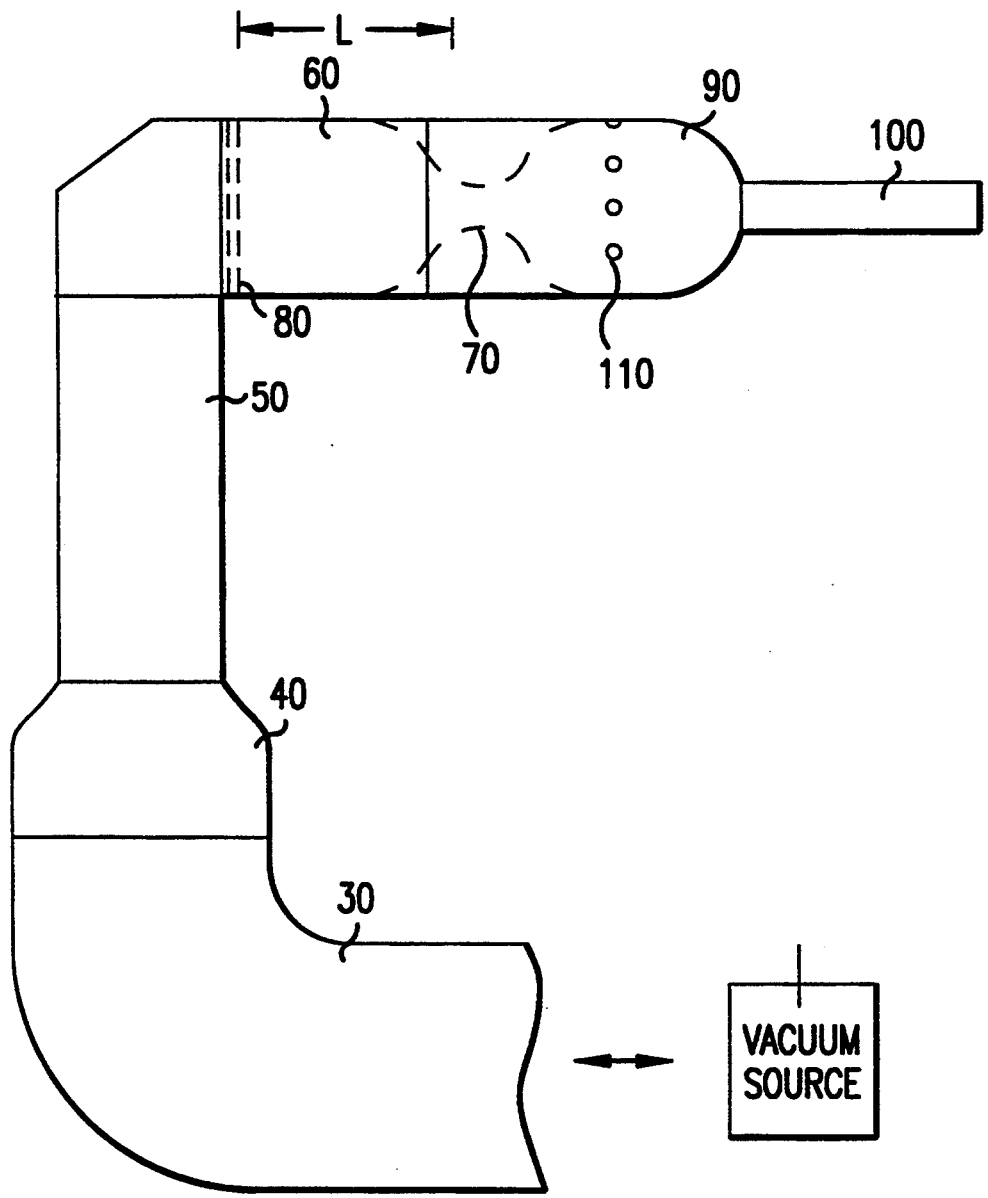
FIG. 1 shows a coarse particle sniffer according to the invention, which is attachable for fluid communication with a vacuum source through a vacuum hose.
Figure 2:
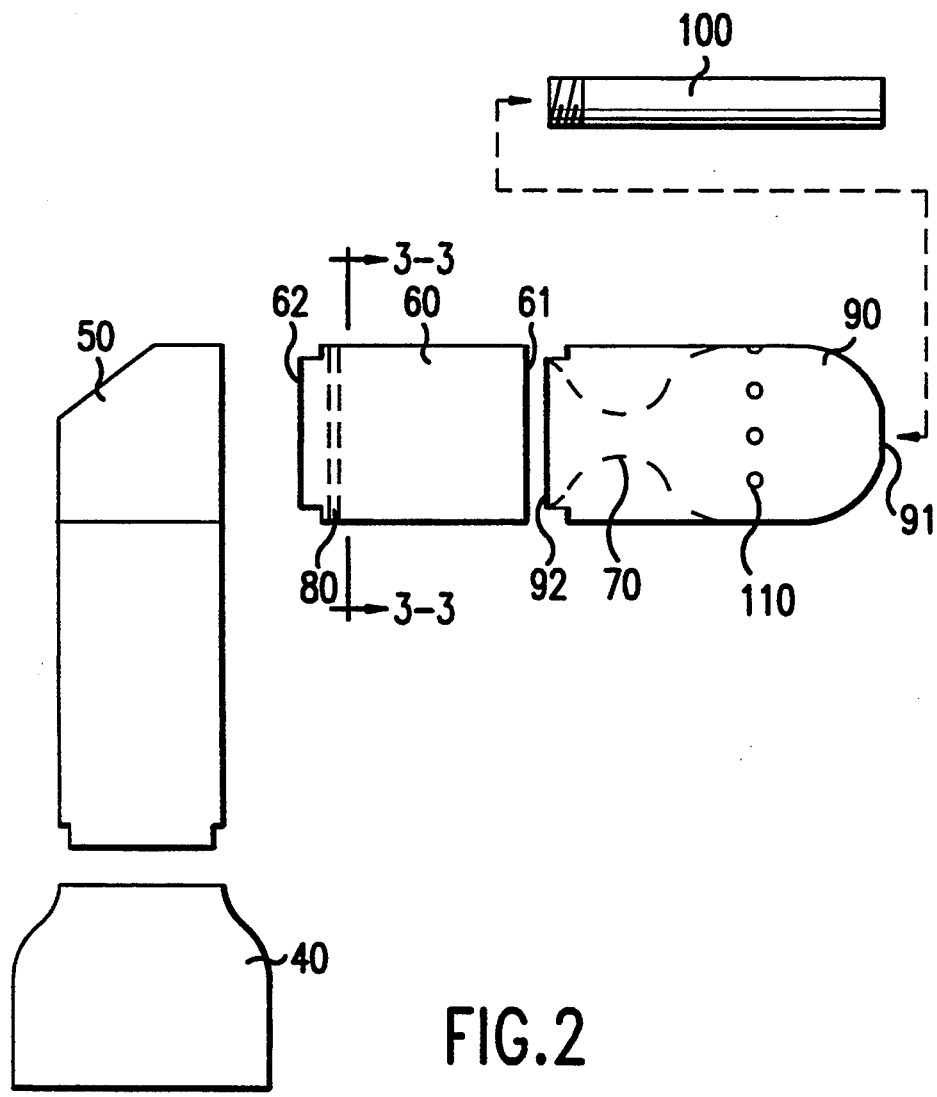
FIG. 2 shows an exploded view of components of the coarse particle sniffer of FIG. 1.

As shown in FIGS. 1 and 2, a coarse particle sniffer 10 is attachable to a vacuum source 20 through a conventional vacuum hose 30. The vacuum source 20 can be any standard, known vacuum source such as those used in industrial, commercial and residential use for vacuum cleaners. Most of these vacuum sources have vacuum hoses having standard hose diameters for compatibility with other cleaner components. Preferred vacuum sources 20 have a vacuum between 3—7 inches of mercury. A preferred, although not limiting, size of vacuum hose is one with a 2.5 inch inner diameter. The vacuum hose 30 is designed to connect with other vacuum hoses to provide a longer hose.

The coarse particle sniffer 10, as better shown in FIG. 2, comprises a hose adaptor 40, a right angle extension 50, a screen holder member 60 having a screen 80, a fluidizing nozzle 90 having a high velocity venturi 70 and extension rods 100. These components cooperate to (1) draw dry particles, such as toner, into the sniffer 10; (2) accelerate the speed of the particles as they approach the screen 80 of the screen holder member 60; and (3) trap any coarse particles within the screen 80.

In its simplest configuration, the sniffer comprises the fluidizing nozzle 90, the screen holder member 60, the high velocity venturi 70 and the screen 80. The fluidizing nozzle 90 serves to draw in dry toner particles and to at least partially separate the particles as they are expelled through the fluidizing nozzle 90 toward the screen holder 60. The fluidizing nozzle 90 has an entrance port 91 and an exit port 92, with the entrance port 91 having a reduced diameter from the diameter of the exit port 92.

The screen holder member 60 has an entrance port 61 sized to mate with the exit port 92 of the fluidizing nozzle 90 and an exit port 62 sized to mate directly with the vacuum hose 30, or optionally to the right angle extension 50 or the adaptor 40. The high speed venturi 70 is preferably located within the fluidizing nozzle 90 near the entrance port 61 and exit port 92, although it could be located within screen holder 60. However, there is a critical relationship necessary for proper operation. A distance L of no less than 1.5" and more preferably no less than 2" is necessary between the screen 80 and the venturi 70 to ensure proper velocity of particles as they reach screen 80. Lesser distances result in excess accumulations and poor device operation.

The venturi 70 increases the particle speed past screen 80. The increased particle speed aids in breaking up particles that may be clumped or accumulated into a mass prior to or as they pass through the screen 80. This is of particular importance when the sampled particles are dry toner, which have a strong tendency to accumulate into clumped masses.

Preferably, the particles have a speed of between 1500 ft./min and 7000 ft./min. after they pass through the venturi 70 and prior to passing through the screen 80. This particle speed range sufficiently breaks and separates accumulated toner masses to filter out only individual particles having mean diameters greater than a chosen filtering mesh size. When dry toner particles are being sampled and collected, this can be achieved by utilizing a venturi of between $\frac{1}{4}"$-$\frac{3}{8}"$, preferably $\frac{1}{4}"$, installed near exit port 92 of fluidizing nozzle at or substantially near the entrance port 61 of the screen holder 60 at a preferred distance of 2" from screen 80 when the fluidizing nozzle is attached to screen holder 60. As shown, venturi 70 tapers from the preferred $1\frac{1}{2}"$ inner diameter of fluidizing nozzle 90 to the reduced diameter, preferably $\frac{1}{4}"$, then tapers back to the inner diameter of the fluidizing nozzle.

Figure 3:
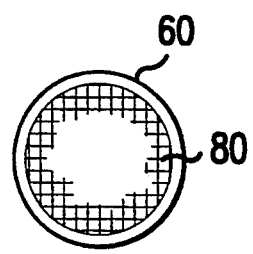
FIG. 3 shows a cross-section of the screen holder of FIG. 2 along line 3—3.

The screen 80 is located normal to the flow path A and has a predetermined mesh size for filtering out coarse particles of a predetermined diameter. Preferably, when dry toner is being sampled, the screen has a 44 micron mesh size and a 1 inch diameter, better shown in FIG. 3, although the specific screen mesh size can vary depending on the application and the particular particles being sampled. Using a 44 mesh size screen 80 allows acceptable toner particles to pass through the screen while retaining overly large (coarse) particles.

The fluidizing nozzle 90 has an entrance port 91 of a predetermined diameter, preferably $\frac{1}{4}"$. As the distance from the entrance port 91 increases toward the exit port 92 on the opposite end, the inner diameter of the nozzle 90 increases up to substantially the same diameter as the inner diameter of the screen holder member 60. Preferably, this diameter increases up to about 1.5 inches the same as the exit port 62 of screen holder 60. As shown, the nozzle 90 preferably has an exponential transition from the entrance port 91 to exit port 92.

A preferred embodiment of the fluidizing nozzle 90 includes air ports 110 extending around the periphery of the fluidizing nozzle 90. The air ports 110 allow air to mix with the drawn toner to aid the toner in flowing through the screen 80 and to avoid plugging. In an exemplary embodiment, 0.0625 inch air ports 110 are provided evenly spaced around the periphery of the nozzle 90. Optionally, 0.125 inch air ports can be provided. However, the sizing and spacing of the air ports 110 can be adjusted to accommodate the specific requirements of the particles being sampled. If, for example, the particles are highly sticky and tend to clump up, a higher admix with air will tend to better break up the particles. If the particles tend to remain separated, the air ports 110 can be spaced further apart or completely omitted. A preferred range is between 8–12 ports 110 around the periphery, and more preferably between 8–10 ports.

In its simplest embodiment, the tool 10 is straight. However, it is beneficial to provide the right angle extension 50 between the vacuum hose 30 and the screen holder 60 for certain applications, such as for sampling toner from hoppers or bins. The specific extension 50 shown also can serve as a handle for an operator to grip and utilize the tool 10. Further, depending on the application, other angles of the extension 50 can be provided and are contemplated.

In some applications it may be beneficial to have the tool 10 sized for a certain internal diameter. However, if this diameter does not match the diameter of vacuum hose 30, it will be necessary to provide a hose adaptor 40. The hose adaptor 40 accommodates a sampling tool of one diameter to a vacuum hose 30 of a different diameter. In a preferred embodiment, the vacuum hose 30 has a 2.5" diameter. The screen holder 60 has a preferred diameter of 1.5". A suitable adaptor 40 for accommodating the 1.5" tool to attach to the 2.5" vacuum hose is a Spencer hose adaptor.

Often, when large bins or hoppers are being sampled, it is necessary to sample deep bins. Proper positioning of tool 10 would be difficult without the aid of further attachments for this application. Preferably, the tool 10 also includes one or more extensions 100 of a diameter the same as or smaller than the entrance port 91 of the fluidizing nozzle 90. The extension rods 100 attach to the entrance port 91 of fluidizing nozzle 90. Preferably, the extension rods 100 are threadably attached to the entrance port 91 of fluidizing nozzle 90 and to additional extension rods 100 to provide any suitable length of extension. This accommodates sampling the bottom of any size bin, hopper or any other hard to reach area that may need to have toner samples taken.

In a preferred embodiment, the extension rods 100 have an inner diameter of approximately $\frac{1}{4}"$ and a length of about 8 inches. Preferably, six extension rods 100 can be threadably attached to one another to provide up to four feet of extension.

In operation, the tool 10 is activated by connecting the tool to the vacuum source 20 through one or more vacuum hoses 30 and turning on the vacuum source. This provides a suction force that draws air and any particles into the internal orifice of the tool 10. Particles and air are sucked by the vacuum into the tool 10 through any extensions 100 and past the entrance port 91 of the fluidizing nozzle 90. As the particles travel through the fluidizing nozzle 90, they slightly slow down because of the enlarged internal diameter of the tapering fluidizing nozzle 90. Within this enlarged space, the particles begin to separate. This is enhanced by the introduction of air through the inlet ports 110 around the periphery of the fluidizing nozzle 90.

Prior to passing through the screen 80, the particles are sped up by passing through the venturi 70. This constriction down to $\frac{3}{8}"$ or more preferably $\frac{1}{4}"$ imparts sufficient velocity to the particles to sufficiently break up any clumped particles prior to and as they pass through the screen 80. Any particles smaller than the mesh of the screen 80 pass through the screen where they travel to the vacuum source 20 through the vacuum hose 30 and any other tool attachments such as the right extension 50, or the adaptor 40.

However, any particles larger than the mesh are trapped and retained within the screen holder 60 by the screen 80. After sampling a determinable amount of particles from a supply such as a toner hopper, the existence of and quantity of any trapped "coarse" particles can be readily ascertained through visual inspection.

Examination of the particles can be performed by in numerous ways. For example, if the screen holder 60 is made from a transparent material such as plastic, or includes a window portion of a transparent material, visual inspection can be performed while the contents are within the screen holder 60 and still attached to tool 10. Preferably, the trapped contents can be viewed within the screen holder 60 by detaching it from the tool 10, and in particular from fluid,zing nozzle 90 and looking through entrance port 61. The contents can also be emptied and placed onto an examining table or receptacle. The contents can be emptied after each sampling, thus allowing quantitative analysis of the trapped "coarse" particles, such as average particle size and quantity. This can be done in addition to visual inspection of the contents.

While the invention has been described in connection with the preferred embodiment, it will be understood that it is not intended to limit the invention to these embodiments. On the contrary, it is intended to cover all alternatives, modifications and equivalents as may be included within the spirit and scope of the invention as defined by the appended claims.

What is claimed is:

1. A method of testing and filtering coarse particulate matter using a testing tool fluidly connected to a vacuum source through a vacuum hose, the tool defining an internal orifice fluidly connected to the vacuum source and comprising a fluidizing nozzle having an inlet port of a predetermined diameter and an exit port of a greater diameter; a screen holder located within the internal orifice between the fluidizing nozzle and the vacuum source, the screen holder having a venturi for increasing the speed of air within the internal orifice and a screen of a predetermined mesh size for trapping coarse particulate matter; and an adaptor for connecting the testing tool to the vacuum hose of the vacuum source, the method comprising the steps of:
   (a) locating the testing tool in a holding device containing particulate matter;
   (b) activating the vacuum source to initiate vacuum air flow into the fluidizing nozzle and the internal orifice, allowing particulate matter within the holding device to enter the internal orifice of the apparatus;
   (c) vacuuming particulate matter into the internal orifice through the venturi to accelerate the particulate matter and separate accumulated particulate matter prior to passing through the screen; and
   (d) filtering out particulate matter of a size greater than the predetermined mesh size with the screen for subsequent visual inspection while allowing particles of a lesser size to pass through the screen and into the vacuum hose.

2. The method of claim 1, further comprising the steps of:
   (e) shutting off the vacuum source; and
   (f) removing the screen holder and examining the particulate matter trapped by the screen.

3. The method of claim 1, wherein step (c) comprises in order the steps of:
   passing particles through a first diameter section;
   passing the particles through a section of an enlarged diameter section;
   and passing the particles through the venturi to accelerate the particles.

4. The method of claim 1, wherein the particulate matter being sampled is dry toner and the predetermined mesh size is a 44 mesh size.

5. The method of claim 1, further comprising allowing air to additionally enter the internal orifice of the fluidizing nozzle through air ports located in spaced relation around the periphery of the fluidizing nozzle to aid in particle separation.

6. The method of claim 1, wherein a plurality of air ports are located in spaced relation around the periphery of the fluidizing nozzle adjacent to an entrance to the venturi, said method further comprising the step of allowing air to enter the fluidizing nozzle through the plurality of air ports to further separate accumulated particulate matter prior to passage through the screen.

7. The method of claim 6, wherein air is allowed to enter the fluidizing nozzle through 8 to 12 air ports.

8. The method of claim 1, further comprising the step of viewing the particulate matter trapped by the screen through a transparent viewing port of the screen holder.

9. The method of claim 1, wherein the venturi is located at least 1.5 inches in front of the screen so that the particulate matter is accelerated and separated in advance of reaching the screen.

10. A method of testing and filtering dry toner using a testing tool fluidly connected to a vacuum source through a vacuum hose, the tool defining an internal orifice fluidly connected to the vacuum source and comprising a fluidizing nozzle having an inlet port of a predetermined diameter and an exit port of a greater diameter; a screen holder located within the internal orifice between the fluidizing nozzle and the vacuum source, the screen holder having a venturi for increasing the speed of air within the internal orifice and a screen of a predetermined mesh size for trapping coarse particulate matter; and an adaptor for connecting the testing tool to the vacuum hose of the vacuum source, the method comprising the steps of:
   (a) locating the testing tool in a dry toner supply hopper containing dry toner;
   (b) activating the vacuum source to initiate vacuum air flow into the fluidizing nozzle and the internal orifice, allowing dry toner within the supply hopper to enter the internal orifice of the apparatus;
   (c) vacuuming dry toner into the internal orifice through the venturi to accelerate the dry toner and separate accumulated dry toner prior to passing through the screen; and
   (d) filtering out dry toner of a size greater than the predetermined mesh size with the screen for subsequent visual inspection while allowing dry toner of a lesser size to pass through the screen and into the vacuum hose.

11. The method of claim 10, further comprising the steps of:
   (e) shutting off the vacuum source; and
   (f) removing the screen holder and examining dry toner trapped by the screen.

12. The method of claim 10, wherein step (c) comprises in order the steps of:
   passing dry toner through a first diameter section;
   passing the dry toner through a section of an enlarged diameter section; and
   passing the particles through the venturi to accelerate the particles.

13. The method of clam 10, wherein the screen filters out particles larger than a 44 mesh size.

14. The method of claim 10, wherein a plurality of air ports are located in spaced relation around the periphery of the fluidizing nozzle adjacent to an entrance to the venturi, said method further comprising the step of allowing air to enter the fluidizing nozzle through the plurality of air ports to further separate accumulated dry toner prior to passage through the screen.

15. The method of claim 10, further comprising the step of viewing the dry toner trapped by the screen through a transparent viewing port of the screen holder.

* * * * *